United States Patent Office 3,449,155

Patented June 10, 1969

1

3,449,155

METHOD OF INHIBITING THE LEAKAGE OF AIR FROM PNEUMATIC TIRE ASSEMBLIES AND SIMILAR STRUCTURES

John C. Fuller, P.O. Box 448, Wecoma Beach, Oreg. 97367

No Drawing. Continuation-in-part of application Ser. No. 286,457, June 10, 1963. This application Mar. 26, 1964, Ser. No. 355,102

Int. Cl. B32b *35/00;* B60c *21/00;* B44d *1/22*

U.S. Cl. 117—95 1 Claim

ABSTRACT OF THE DISCLOSURE

A method of inhibiting the leakage of air from pneumatic tire assemblies and similar structures, comprising introducing into the air space there of an aqueous solution consisting essentially of at least 4% by weight of at least one material form the class consisting of the water soluble salts of boric acid; the aliphatic acids, formic, acetic, propionic, butyric, glycolic, lactic, tartoric and citric; and the water soluble salts thereof; inflating said air space with air under pressure; and then rotating the tire assembly or similar structure, while inflated, to distribute the solution over the surface defining the air space.

This invention relates to sealant compositions, and more particularly to compositions for and the method of inhibiting the leakage of air from pneumatic tire assemblies and similar structures operable to hold a volume of air under pressure.

The present paplication is a continuation-in-part of my earlier application filed on the 10th day of June, 1963 under Ser. No. 286,457 and entitled, Air Leakage Inhibiting Compositions now abandoned.

The present invention has particular utility in inhibiting the loss of air from pneumatic tire assemblies. These are classified generally as "tube-type" in which a casing confines an inner tube filled with air under pressure, and "tubeless" in which a lined casing is sealed to a metal wheel rim with the casing and rim defining the space filled with air under pressure. The present invention is operable for both types of tire assemblies, whether of natural or synthetic rubber.

Gradual loss of air pressure from "tube-type" tire assemblies may occur by seepage through the inner tube because of the permeability of the rubber or because of small openings therein. Similar loss of air pressure in "tubeless" tire assemblies may occur by seepage through the liner and casing. Such loss of air pressure results in cord fatigue and other deterioration, due to excessive flexing and heat.

Of at least equal seriousness is the incidence of ply separation in "tubeless" tires, resulting from seepage of air pressure outwardly through the tire. Such separation occurs between any of the plies, in new as well as recapped tires, and most frequently occurs in the top ply area in recapped tires. It is generally recognized in the retreading art that the incidence of such separation ranges upwardly to about fifteen percent of the total production of recapped tires.

Various types of compositions have been proposed heretofore for inhibiting the loss of air from pneumatic tire assemblies. In general, however, certain inherent deficiencies in these compositions have rendered them less than completely satisfactory. For example, some tend to cause unbalancing of the mounted tire assemblies, either because of the consistency of the composition, or because of the excessive quantity required for effective sealing. Some cause swelling, or softening, or otherwise adversely

2 affect the cord structure and/or the rubber of the tire assembly. Some harden or cake within the tire assembly with consequent loss of sealing quality after relatively short periods of time. Some are of a paste-like or highly viscous consistency, rendering them difficult to introduce into the interior of the tire assembly. And some are not usable with tubeless tire assemblies because of their corrosive effect on the metal wheel rim.

Accordingly, it is the principal object of this invention to provide an improved sealant composition for inhibiting air leakage from pneumatic tire assemblies and the like, which is characterized by having unexpectedly effective sealing properties while avoiding the disadvantages described hereinbefore.

Another important object of the present invention is to provide a sealant composition of the class described, characterized by ease of injection into a tire assembly, by effective sealing of a tire assembly with a minimum amount of the composition, and by long service life under all conditions of tire usage.

Still another important object of this invention is the provision of a sealant composition of the class described which is composed of relatively inexpensive materials and is inexpensive to produce, thus making them available at minimum cost.

A further important object of the present invention is to provide a novel method of treating pneumatic tire assemblies and the like, to inhibit the loss of air therefrom.

The foregoing and other objects and advantages of the present invention will appear from the following detailed description.

In its broad aspect, the present invention involves the injection into a pneumatic tire assembly or the like, of a low viscosity free flowing aqueous solution of one or more sealant materials described in detail hereinafter, in an amount sufficient to thoroughly wet the interior of the tire assembly, then inflating the tire assembly with air under pressure, and thereafter rotating the tire assembly to effect thorough wetting thereof, whereupon the aqueous solution is forced outward under the pressure of escaping air, into the openings to be sealed.

In general, the sealant composition of the present invention consists essentially of an aqueous solution of at least one of the materials selected from the class consisting of the alkali metal borates and carbonates, the aliphatic acids formic, acetic, propionic, butyric, glycolic, lactic, tartaric and citric, and the water soluble salts of said aliphatic acids. The concentration of one or more of these materials in the aqueous solution is dependent in part upon the solubility thereof in water, and in part upon the resulting viscosity of the solution. In general, at least about 4% by weight of the material in water is required to provide an effective degree of sealing of the tire assembly or the like against the gradual loss of air pressure. From 10 to 15% by weight of one or more of these materials in the aqueous solution is preferred. However, greater concentrations, for example in excess of 25% by weight, may be employed where solubility permits and the viscosity is sufficeintly low that the solution flows freely at atmospheric temperature.

When the aforementioned aliphatic acids are employed in the aqueous solution, particularly for "tubeless" tire assemblies, it may be desirable to include a rust inhibitor to minimize corrosion of the metal wheel rim. Any of the well known and commercially available rust inhibitors may be used, provided they are water soluble and compatible with the acid or acids employed. Such rust inhibitors may be used in concentrations ranging from about 1 to about 20% by weight. Exemplary of such rust inhibitors are the sulphonated vegetable or petroleum oils, such as sulphonated castor oil, the soluble oils characterized as emulsified oils, and certain high molecular weight amine compositions.

The preferred sealant composition of the present invention employs one or more of the water soluble salts of the aforementioned acids, since these have been found to be substantially non-corrosive to the metal wheel rim.

Of the materials set forth hereinbefore, those preferred for the present invention are borax and the alkali metal salts, preferably the sodium salts, of lactic acid and citric acid, and combinations thereof. However, the calcium, aluminum and other water soluble salts of the aliphatic acids also are operable to a practical degree.

The amount of aqueous solution required for protecting a tire assembly from seepage losses of air pressure ranges from about 1 to 3 ounces per 10 square feet of rubber surface defining the inner air space of the tire assembly. The preferred quantity is about 2 ounces per 10 square feet. Thus, a conventional tire of the 6.70 x 15 size requires about 2 ounces of the solution to provide a uniform film over the inner rubber surface, with some small excess remaining. Proportionately large amounts are needed for larger tires, as will be understood from the following description.

If desired, conventional antifreeze such as ethylene glycol, may be incorporated in the solution to prevent freezing in cold climates or at high altitudes. In this regard the composition has utility in the landing tires of aircraft, as well as ground vehicles.

The following examples are illustrative of the compositions of the present invention:

A solution of 10 parts by weight of commercial lactic acid (85% lactic acid in water) and 90 parts by weight of water was prepared. Two ounce quantities of this solution were introduced into a number of standard passenger tire assemblies, of both the tube and tubeless type, through the valve stem after removal of the valve core. After inflation each tire assembly was rotated to distribute the solution over the entire inner surface of the tire.

The tire assemblies before treatment had been observed to lose from 3 to 5 pounds of air pressure in the course of normal driving over a period of one week (from 300 to 400 miles of driving). With the foregoing sealant composition installed in the tire assemblies, no measurable loss of air pressure occurred over a similar driving time. The balance of the tire assemblies was not impaired.

Other tire assemblies of similar types were treated in the same manner with the same solution to which one part of a rust inhibitor (a sulphonated soluble oil) was added. The results of these tests were substantially identical to those previously described, with the additional benefit of incurring no observable corrosion of the wheel rims.

In another example, a tubeless tire casing that was essentially sound was punctured at approximately twenty places in the butyl liner, by means of a sharpened end of a paper clip (having a diameter of approximately 1/32 of an inch). Prior to treatment of the tire casing with the aforementioned solution, the tire showed an air pressure drop of approximately six pounds after 400 miles of driving. Following treatment with the sealant solution, no loss of air pressure occurred after several hundred miles of driving.

In still another example, several punctures were made in the casing of a tubeless tire, using a 1/8" diameter nail. The tire casing was mounted on a rim and the aforementioned solution introduced into the tire assembly and the latter than inflated. When the tire assembly was rotated to bring the solution into the area of the punctures, the solution spurted out momentarily through the punctures with the escaping air. However, after a few seconds the outward flow of liquid and air stopped. After a week of driving, in excess of 300 miles, this tire still held enough air to support the vehicle.

Equal or superior results were obtained with various other solutions. Among these were aqueous solutions containing about 10% by weight of sodium lactate and from about 2 to 10% by weight of borax as a buffer. Extended use of these solutions in tubeless tires resulted in no noticeable corrosion of the wheel rims.

Of equal effectiveness was an aqueous solution containing about 15% by weight of sodium citrate and about 2% by weight of borax. Equally effective results were obtained with an aqueous solution consisting essentially of a substantially saturated solution of borax in water at atmospheric temperature, i.e., about 10 to 15% by weight of borax.

Slightly less effetcive results were obtained with an aqueous solution containing about 5% by weight sodium lactate, about 2½% by weight sodium tartrate, and about 2½% by weight sodium glycolate. Similar results were obtained with an aqueous solution containing about 5% by weight calcium lactate, and also with an aqueous solution containing about 10% by weight sodium tartrate. Other solutions of similar effectiveness were the following: an aqueous solution of about 15% by weight sodium acetate and 2% by weight borax; an aqueous solution of about 15% by weight sodium carbonate; and an aqueous solution containing about 10% by weight aluminum lactate.

In other examples, effective sealant solutions were prepared from 20 parts by weight citric acid and 80 parts by weight of water; about 20 parts by weight of glycolic acid and 80 parts by weight of water; 10 parts by weight of propionic acid and 90 parts by weight of water; 10 parts by weight of butyric acid and 90 parts by weight of water; and similar solutions of the sodium salts of these acids.

All of the foregoing solutions provide effective sealing of the tire with no noticeable adverse effect on the rubber of the tires. Wheel rim corrosion does not occur with the acid salt solutions, nor with the acid solutions in which a rust inhibitor is incorporated. The low viscosity of the solutions enables them to be introduced into the tire casing assemblies simply by pouring through the unobstructed valve stem, and facilitates the uniform distribution of the solutions over the inner surface of the tires. The solutions do not harden, but rather remain fluid over extended periods of usage in the tires, providing long services life.

Extensive tests with the sealant compositions in retreated tires have demonstrated the effectiveness of the solutions in substantially eliminating the incidence of separation of the retread stock from the undertread. Thus, the sealant compositions are effective in overcoming the most serious problem heretofore experienced in the recapping art.

Although the present invention has particularly utility in connection with pneumatic tire assemblies, it is also effective in preventing the loss of air pressure in other structures such as basketballs, footballs and other similar objects.

It will be apparent to those skilled in the art that various changs may be made in the numbers and proportions of ingredients and in the method steps described hereinbefore, without departing from the spirit of this invention and the scope of the appended claim.

Having now described my invention and the manner in which it may be used, what I claim as new and desire to secure by Letters Patent is:

1. The method of treating a pneumatic tire assembly and the like to inhibit the loss of air pressure therefrom, comprising introducing into the air space theerof a free flowing aqueous solution consisting essentially of at least about 4% by weight of at least one of the materials selected from the class consisting of the water soluble salts of boric acid, the aliphatic acids, formic, acetic, propionic, butyric, glycolic, lactic, tartaric and citric, and the water soluble salts of said aliphatic acids, the amount of said solution ranging from about one to about 3 ounnces for every 10 square feet of resilient surface defining the air space, inflating said air space with air under pressure, and then rotating the tire assembly or the like while the same is inflated to distribute the solution over the resilient surface defining the air space.

References Cited

UNITED STATES PATENTS

| | | | |
|---|---|---|---|
| 1,540,580 | 6/1925 | Warner | 260—782 |
| 1,981,822 | 11/1934 | Burwell. | |
| 2,100,085 | 11/1937 | Newman | 260—782 |
| 2,241,801 | 5/1941 | Yohe et al. | 260—782 X |
| 2,339,542 | 1/1944 | Hale | 152—347 X |
| 2,344,709 | 3/1944 | Lasher | 106—33 |

FOREIGN PATENTS

| | | |
|---|---|---|
| 395,109 | 7/1933 | Great Britain. |

OTHER REFERENCES

Handbook of Chemistry and Physics, 34th Ed., 1952–1953, published by Chemical Rubber Publishing Co., Ohio, pages 924–5, 796–7, 578–9, 1092–3, 1687–8, 1709, 1721–2, 1743, 1747–48, 1755, 1760, 1765, 1775, 1792 relied on.

JULIUS FROME, *Primary Examiner.*

J. B. EVANS, *Assistant Examiner.*

U.S. Cl. X.R.

106—33; 117—139; 152—347; 156—97; 161—405; 252—72